United States Patent [19]

Yoshida

[11] Patent Number: 5,305,249
[45] Date of Patent: Apr. 19, 1994

[54] DIGITAL SIGNAL PROCESSOR FOR VIDEO SIGNALS

[75] Inventor: Akio Yoshida, Tokyo, Japan
[73] Assignee: NEC Corporation, Tokyo, Japan
[21] Appl. No.: 38,558
[22] Filed: Mar. 26, 1993

Related U.S. Application Data

[63] Continuation of Ser. No. 736,585, Jul. 26, 1991, abandoned.

[30] Foreign Application Priority Data

Jul. 27, 1990 [JP] Japan .................................. 2-199550

[51] Int. Cl.$^5$ .............................................. G06F 7/50
[52] U.S. Cl. .................................. 364/768; 364/715.01
[58] Field of Search ................... 364/768, 748, 715.08, 364/715.01

[56] References Cited

U.S. PATENT DOCUMENTS

| 3,814,925 | 6/1974 | Spannagel | 364/748 X |
| 4,849,921 | 7/1989 | Yasumoto et al. | 364/715.01 |
| 4,890,251 | 12/1989 | Nitta et al. | 364/715.08 |
| 4,908,788 | 3/1990 | Fujiyama | 364/748 |
| 4,953,115 | 8/1990 | Kanoh | 364/715.01 |

Primary Examiner—Tan V. Mai
Attorney, Agent, or Firm—Whitham & Marhoefer

[57] ABSTRACT

Arithmetic logic unit has an arithmetic logic circuit, an arithmetic circuit, and a selector which form a digital signal processor for processing video signals to be supplied to a display. The arithmetic logic circuit carries out one calculation selected from an addition of first and second input signals, a subtraction of the second input signal from the first input signal, and a subtraction of the first input signal from the second input signal, and the arithmetic circuit carries out a calculation selected from an addition of the first and second input signals and a subtraction of the first input signal from the second input signal. As a result of these calculations, the selector selects one of output signals of the arithmetic logic circuit and the arithmetic circuit. In this arithmetic logic unit, one of calculations of parallel addition and subtraction, addition and subtraction with selection, and absolute value of a difference is carried out.

8 Claims, 3 Drawing Sheets

DIGITAL SIGNAL PROCESSOR FOR VIDEO SIGNALS

This is a continuation of Ser. No. 736,585 filed Jul. 26, 1991 and now abandoned.

FIELD OF THE INVENTION

The invention relates to an arithmetic logic unit, and more particularly to, an arithmetic logic unit which is a digital signal processor (DSP) for processing video signals to be supplied to a display such as a CRT.

BACKGROUND OF THE INVENTION

Coding of video signals for motion picture images is one type of video signal processings. For the purpose of compressing motion picture images, a motion compensation processing, a discrete consine transfer (DCT) processing, a quantization processing, etc. are utilized. The detail of these processings are described in the chapter 7 of Multi-Dimensional Signal Processing published by Nikkan Kogyo Shinbun.

In the motion compensation processing, block matching is realized between picture image regions to detect the motion of an object among consecutive frames. A fundamental processing P which is carried out for the block matching is expressed by an equation (1).

$$P = \Sigma |a - b| \quad (1)$$

For a high speed calculation method of the DCT processing, an FCT processing is utilized. This is a processing, in which several kinds of butterfly calculations are utilized as fundamental calculations. One of the butterfly calculations is expressed by an equation (2).

$$\begin{aligned} a' &= a + b \\ b' &= a - b \end{aligned} \quad (2)$$

where "a" and "b" are signals to be processed. The detail of the FCT processing is described in a preparatory report entitled "Discrete Cosine Transfer Coding on the Video Signal Processor" of the national convention for 70 year anniversary of "the Institute of Electronics Informations and Communications Engineers".

For a reverse processing of the quantization processing, a reverse quantization processing is utilized. In the reverse quantization processing described in the revision of the recommendation H 261 for a visual telephony coding system of p * 64 Kbps by the CCITT, and equation (3) which is a fundamental calculation is utilized.

$$a' = \begin{cases} a + b\, (a > 0) \\ a - b\, (a < 0) \end{cases} \quad (3)$$

The detail of the reverse quantization processing is described in "CCITT SGXV WP XV/1 Specialists Group on Coding for Visual Telephony, Doc. No 584, 1989".

Next, one of conventional arithmetic logic unit which is described in the Japanese Patent Provisional Publication (Kokai) No. 61-296427 will be explained. The conventional arithmetic logic unit comprises an arithmetic logic circuit for carrying out logic calculations of AND, OR, exclusive OR, and others between first and second input signals A and B to be expressed by complements of 2, an adding calculation of the first and second input signals A and B, and a subtracting calculation of the second input signal B from the first input signal A, a subtracting circuit for subtracting the first input signal A from the second input signal B, and a selecting circuit for selecting one output signal from output signals of the arithmetic logic circuit and the subtracting circuit.

In operation, the calculation of absolute value $|A-B|$ for the difference between the two input signals A and B, etc. are carried out, although the detail of the operation will be explained later.

According to the conventional arithmetic logic unit, however, there is a disadvantage in that the aforementioned equations (2) and (3) can not be conducted by a single command, because it is fixed that the aforementioned equation (1) is conducted by one command.

SUMMARY OF THE INVENTION

Accordingly, it is an object of the invention to provide an arithmetic logic unit in which the aforementioned equation (1), (2) and (3) can be conducted by a single command.

According to the invention, an arithmetic logic unit, comprises:

an arithmetic logic circuit for receiving first and second input signals, each of the first and second input signals being a complement of 2 consisting of plural bits;

an arithmetic circuit for receiving the first and second input signals;

a selector for selecting one of output signals from the arithmetic logic circuit and the arithmetic circuit; and an output circuit having first and second output terminals, an output signal of the selector being obtained at the first output terminal, and an output signal of the arithmetic circuit being obtained at the second output terminal.

BRIEF DESCRIPTION OF THE DRAWINGS

The invention will be explained in more detail in conjunction with appended drawings, wherein.

DESCRIPTION OF THE PREFERRED EMBODIMENTS

Before explaining an arithmetic logic unit of the first preferred embodiment according to the invention, the aforementioned conventional arithmetic logic unit will be explained.

Figure 1:
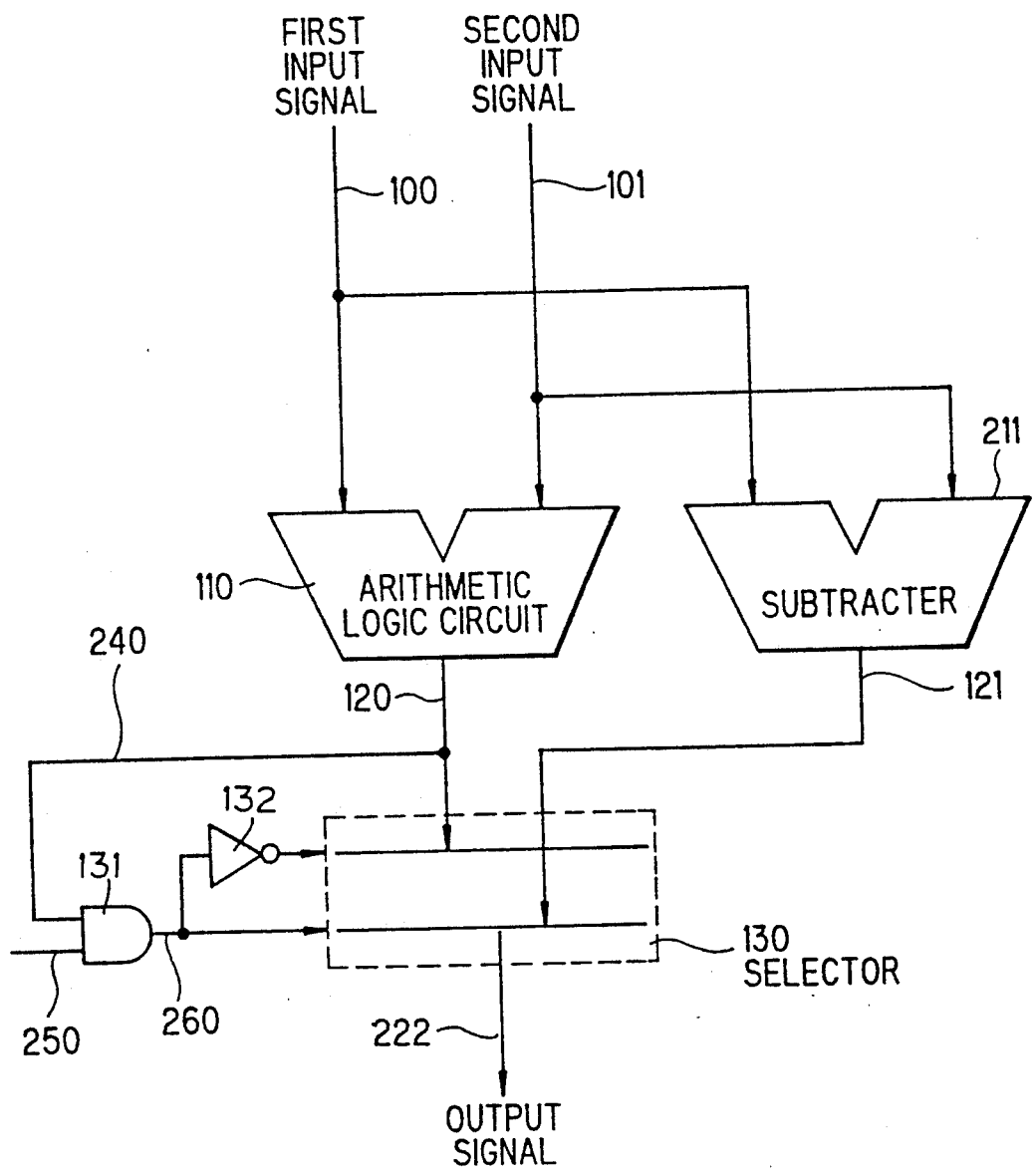
FIG. 1 is a block diagram showing a conventional arithmetic logic unit.

In FIG. 1, the conventional arithmetic logic unit comprises an arithmetic logic circuit 110, a subtractor (subtracting circuit) 211, and a selector (selecting circuit) 130. The selector is controlled by selecting signals supplied from an AND circuit 131 and an inverter 132 connected to the AND circuit 131.

In operation, when a signal 250 of "1" is supplied to the AND circuit 131, the calculation of absolute value $|A-B|$ will be carried out, where A and B are first and second input signals 100 and 101, respectively, to be expressed by complements of 2. In this absolute value calculation, the arithmetic logic circuit 110 carries out the subtraction of the second input signal 101 (B) from the first input signal 100 (A) to provide the selector 130 with an output signal 120, and to provide the AND circuit 131 with the most significant bit (MSB) 240 of the output signal 120, and the subtractor 211 carries out the subtraction of the first input signal 100 (A) from the second input signal 101 (B) to provide the selector 130 with an output signal 121. When the output signal 120 is negative, the MSB 240 of the output signal 120 is "1", so that the AND circuit 131 provides the selector 130 with a selecting signal of "1". As a result, the selector 130 selects the output signal 121 supplied from the subtractor 21 as an output signal 222. On the other hand, when the output signal 120 is positive, the inverter 132 provides the selector 130 with a selecting signal of "1", so that the selector 130 selects the output signal 120 supplied from the arithmetic logic circuit 110 as the output signal 222.

However, the aforementioned disadvantage occurs in this conventional arithmetic logic unit.

Next, an arithmetic logic unit of the first preferred embodiment according to the invention will be explained.

Figure 2:
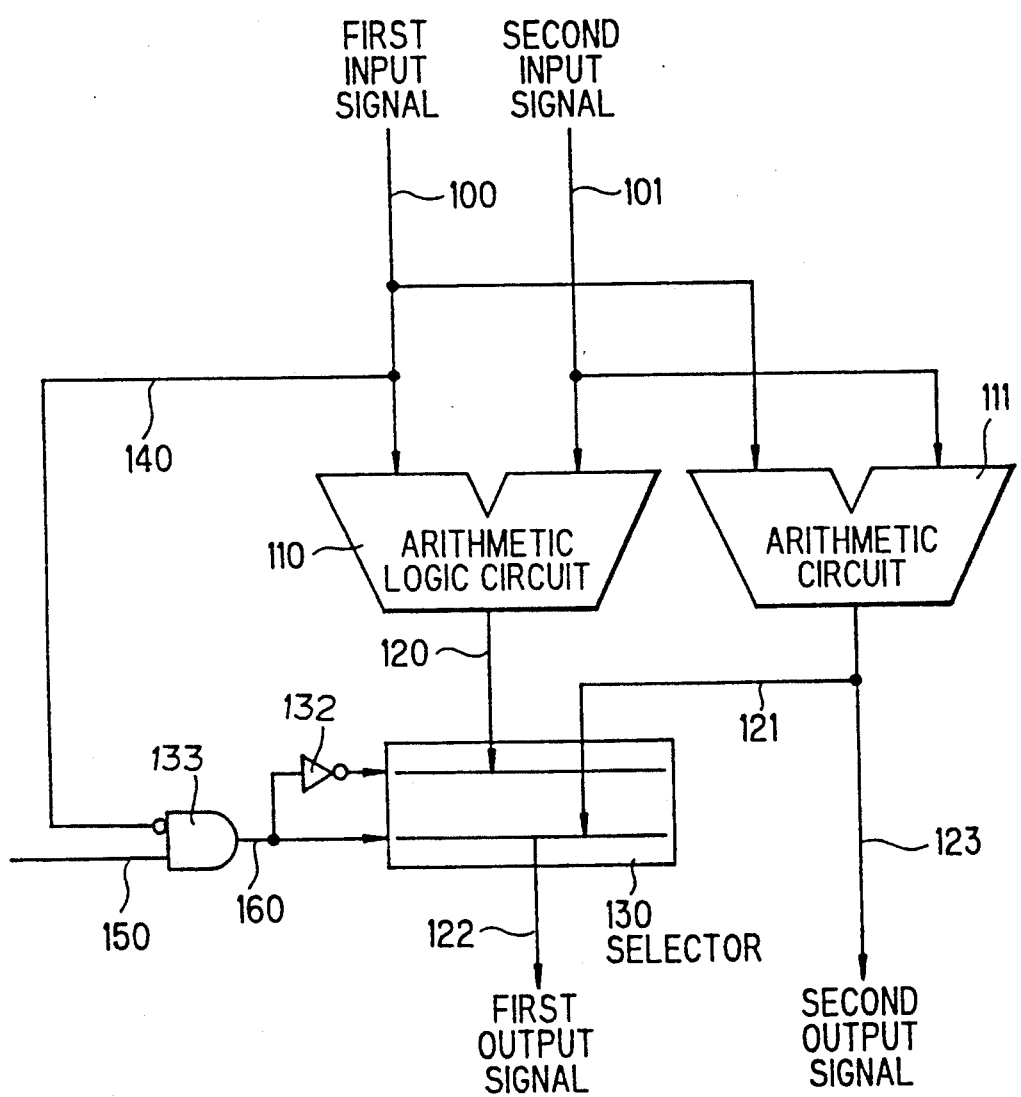
FIGS. 2 and 3 are block diagrams showing arithmetic logic units of first and second preferred embodiments according to the invention.

In FIG. 2, the arithmetic logic unit comprises an arithmetic logic circuit 110, an arithmetic circuit 111, and a selector 130 for selecting one output signal as an output signal 122 from output signals 120 and 121 of the arithmetic logic circuit 110 and the arithmetic circuit 111 by receiving a selecting signal of "1" from an inverter 132 or an AND circuit 133 having inverted and non-inverted input terminals.

In operation, when a signal 150 of "0" is supplied to the non-inverted terminal of the AND circuit 133, the calculation of parallel addition and subtraction will be carried out. In this calculation, the arithmetic logic unit 110 carries out the subtraction of a second input signal 101 from a first input signal 100, and the arithmetic circuit 111 carries out the addition of the first and second input signals 100 and 101. At this time, the AND circuit 133 provides the selector 130 with an output signal 160 of "0", so that the output signal 120 of the arithmetic logic circuit 110 is selected as a first output signal 122 by the selector 130, and the output signal 121 of the arithmetic circuit 111 is directly supplied as a second output signal 123 to a following stage.

The below table shows one example of the first and second input signals 100 and 101, and the first and second output signals 122 and 123 by hexadecinormal and binary notations.

first input signal 100, and the arithmetic circuit 111 carries out the addition of the first and second input signals 100 and 101. At this time, the selector 130 selects one of the output signals 120 and 121 of the arithmetic logic circuit 110 and the arithmetic circuit 111 by receiving a selecting signal 160 of "1" or "0" supplied from the AND circuit 133, to which the aforementioned signal 150 and the MSB 140 of the first input signal 100 to be inverted are supplied. That is, when the first input signal 100 is negative, the selecting signal 160 is "0", so that the output signal 120 of the arithmetic logic circuit 110 is selected as the first output signal 122 by the selector 130. On the contrary, when the first input signal 100 is positive, the selecting signal 160 is "1", so that the output signal 121 of the arithmetic circuit 111 is selected as the first output signal 122 by the selector 130. The below table shows one example of the first and second input signals 100 and 101, and the first and second output signals 122 and 123.

| | THE CALCULATION OF ADDITION AND SUBTRACTION WITH SELECTION | | | |
|---|---|---|---|---|
| | FIRST INPUT SIGNAL 100 | SECOND INPUT SIGNAL 101 | FIRST OUTPUT SIGNAL 122 | SECOND OUTPUT SIGNAL 123 |
| | $22_{(16)}$ | $A0_{(16)}$ | $C2_{(16)}$ | $C2_{(16)}$ |
| | $00100010_{(2)}$ | $10100000_{(2)}$ | $11000010_{(2)}$ | $11000010_{(2)}$ |

Figure 3:
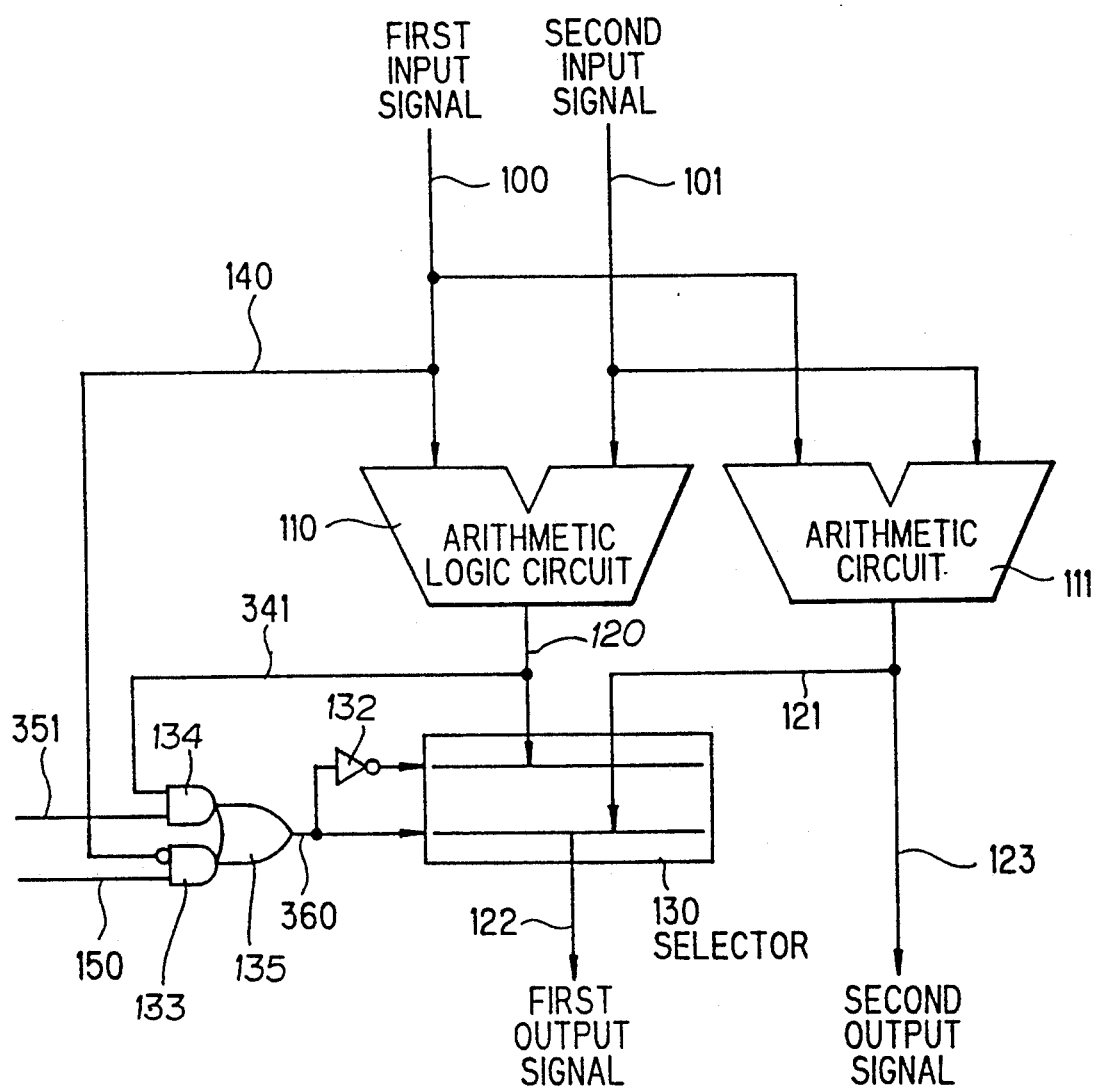

In FIG. 3, an arithmetic logic unit of the second preferred embodiment according to the invention will be explained, wherein like parts are indicated by like reference numerals as used in FIG. 2.

In this preferred embodiment, a selecting signal 360 is supplied from an OR circuit 135 to the selector 130, and an AND circuit 134 is connected at its output terminal to the OR circuit 135 and at its input terminals to the output of the arithmetic logic circuit 110 and a command source (not shown) for generating a command of instructing an absolute value calculation of difference.

In operation, when the signal 150 of "0" and the signal 351 of "0" are supplied to the AND circuits 133 and 134, the calculation of parallel addition and subtraction will be carried out. In this calculation, the arithmetic logic circuit 110 carries out the subtraction of the second input signal 101 from the first input signal 100, and the arithmetic circuit 111 carries out the addition of the first and second input signals 100 and 101. At this time, the MSB 140 of the first input signal 100 is inverted to be supplied to the AND circuit 133, and the MSB 341 of the output signal 120 supplied from the arithmetic logic circuit 110 is supplied to the AND circuit 134. As a result, the selecting signal 360 is "0", so that the output signal 120 is selected as the first output signal 122 by the selector 130, and the output signal 121 is supplied as the second output signal 123 to a following stage.

| THE CALCULATION OF PARALLEL ADDITION AND SUBTRACTION | | | |
|---|---|---|---|
| FIRST INPUT SIGNAL 100 | SECOND INPUT SIGNAL 101 | FIRST OUTPUT SIGNAL 122 | SECOND OUTPUT SIGNAL 123 |
| $22_{(16)}$ | $A0_{(16)}$ | $82_{(16)}$ | $C2_{(16)}$ |
| $00100010_{(2)}$ | $10100000_{(2)}$ | $10000010_{(2)}$ | $11000010_{(2)}$ |

On the other hand, when a signal of "1" is supplied to the AND circuit 133, the calculation of addition and subtraction with selection will be carried out. In this calculation, the arithmetic logic circuit 110 carries out the subtraction of the second input signal 101 from the When the signal 150 is "1" and the signal 351 is "0", the calculation of addition and subtraction with selection will be carried out. In this calculation, the arithmetic logic circuit 110 carries out the subtraction of the second input signal 101 from the first input signal 100, and the arithmetic circuit 111 carries out the addition of the first and second input signal 100 and 101. At this time, when the first input signal is negative, the selecting signal 360 is "0", so that the output signal 120 of the arithmetic logic circuit 110 is selected as the first output signal 122 by the selector 130. On the contrary, when the first input signal 100 is positive, the selecting signal 360 is "1", so that the output signal 121 of the arithmetic circuit 111 is selected as the first output signal 122 by the selector 130.

When the signal 150 is "0", and the signal 351 is "1", the calculation of absolute value of difference will be carried out. In this calculation, the arithmetic logic circuit 110 carries out the subtraction of the second input signal 101 from the first input signal 100, and the arithmetic circuit 111 carries out the subtraction of the first input signal 100 from the second input signal 101. At this time, the MSB 341 of the output signal 120 and the signal 351 of "1" are supplied to the AND circuit 134, so that the selecting signal 360 is "1" to supply the output signal 121 as the first output signal 122 from the selector 130 to a following stage, when the output signal 120 is negative, and the selecting signal 360 is "0" to supply the output signal 120 as the first output signal 122 from the selector 130 to the following stage, when the first input signal 100 is positive.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A digital signal processor, comprising:
   an arithmetic logic circuit for receiving first and second input signals, each of said first and second input signals being a complement of 2 consisting of plural bits, said arithmetic logic circuit performing one of a plurality of arithmetic operations selected from an addition of said first and second input signals, a first subtraction of said second input signal from said first input signal, and a second subtraction of said first input signal from said second input signal;
   an arithmetic circuit for receiving said first and second input signals, said arithmetic circuit performing one of the arithmetic operations of an addition of said first and second input signals and a subtraction of said first input signal from said second input signal;
   selector means being responsive to a sign bit of said first input signal for selecting one of output signals from said arithmetic logic circuit and said arithmetic circuit; and
   an output circuit having first and second output terminals, an output signal of said selector being directly obtained at said first output terminal, and an output signal of said arithmetic circuit being directly obtained at said second output terminal, said output signal of said selector at said first output terminal and said output signal of said arithmetic circuit at said second output terminal being obtained in parallel;
   wherein said arithmetic logic circuit carries out said first subtraction, said arithmetic circuit carries out said addition of said first and second input signals, and said selector means selects an output signal of said arithmetic circuit in a first case that said first input signal is positive, and an output signal of said arithmetic logic circuit in a second case that said first input signal is negative, so that a result of said addition is obtained at said first output terminal in said first case. and a result of said first subtraction is obtained at said first output terminal in said second case, when a calculation of addition and subtraction with selection is instructed.

2. A digital signal processor, according to claim 1, wherein:
   said arithmetic logic circuit carries out said first subtraction, said arithmetic circuit carries out said addition of said first and second input signals, and said selector means selects an output signal of said arithmetic logic circuit, so that a result of said first subtraction is obtained at said first output terminal, and a result of said addition is obtained at said second output terminal, when a calculation of parallel addition and subtraction is instructed.

3. A digital signal processor, according to claim 1, wherein:
   said selector means is further responsive to a sign bit of an output signal of said arithmetic logic circuit and said arithmetic logic circuit carries out said first subtraction, said arithmetic circuit carries out said subtraction, and said selector means selects an output signal of said arithmetic logic circuit in case that said output signal of said arithmetic logic circuit is positive, and an output signal of said arithmetic circuit in case that said output signal of said arithmetic logic circuit is negative, so that an absolute value of a difference between said first output terminal, when a calculation of an absolute value of a difference is instructed.

4. A digital signal processor, comprising:
   an arithmetic logic circuit for receiving first and second input signals, each of said first and second input signals being a complement of 2 consisting of plural bits, said arithmetic logic circuit performing one of a plurality of arithmetic operations selected from an addition of said first and second input signals, a first subtraction of said second input signal from said first input signal, and a second subtraction of said first input signal from said second input signal;
   an arithmetic circuit for receiving said first and second input signals, said arithmetic circuit performing one of the arithmetic operations of an addition of said first and second input signals and a subtraction of said first input signal from said second input signal;
   selector means being responsive to a sign bit of said first input signal for selecting one of output signals from said arithmetic logic circuit and said arithmetic circuit, said selector means comprising:
      an AND gate having a first input and a second, inverting input and generating a first selecting output signal, said first input being connected to receive a command signal and said second, inverting input being connected to said sign bit of said first input signal;
      an inverter connected to the output of said AND gate and generating a second selecting output signal; and
      a selector circuit having an output directly connected to said first output terminal and responsive to said first and second selecting output signals, respectively, of said AND gate and said inverter for selecting one of the outputs of said arithmetic logic circuit and said arithmetic circuit; and an output circuit having first and second output terminals, an output signal of said selector being directly obtained at said first output terminal, and an output signal of said arithmetic circuit being directly obtained at said second output terminal, said output signal of said selector at said first output terminal and said output signal of said arithmetic circuit at said second output terminal being obtained in parallel;

wherein a calculation of addition and subtraction with selection is instructed when said command signal is "1", said arithmetic logic circuit carries out said first subtraction, said arithmetic circuit carries out said addition of said first and second input signals, and said selector means selects an output signal of said arithmetic circuit in a first case that said first input signal is positive, and an output signal of said arithmetic logic circuit in a second case that said first input signal is negative, so that a result of said addition is obtained at said first output terminal in said first case, and a result of said first subtraction is obtained at said first output terminal in said second case.

5. An arithmetic logic unit, according to claim 4, wherein a calculation of parallel addition and subtraction is instructed when said command signal is a "0", said arithmetic logic circuit carries out said first subtraction, said arithmetic circuit carries out said addition of said first and second input signals, and said selector means selects an output signal of said arithmetic logic circuit, so that a result of said first subtraction is obtained at said first output terminal, and a result of said addition is obtained at said second output terminal.

6. A digital signal processor, comprising:

an arithmetic logic circuit for receiving first and second input signals, each of said first and second input signals being a complement of 2 consisting of plural bits, said arithmetic logic circuit performing one of a plurality of arithmetic operations selected from an addition of said first and second input signals, a first subtraction of said second input signal from said first input signal, and a second subtraction of said first input signal from said second input signal;

an arithmetic circuit for receiving said first and second input signals, said arithmetic circuit performing one of the arithmetic operations of an addition of said first and second input signals and a subtraction of said first input signal from said second input signal;

selector means being responsive to a sign bit of said first input signal for selecting one of output signals from said arithmetic logic circuit and said arithmetic circuit, said selector means comprising:

a first AND gate having a first input and a second, inverting input and generating a first output signal, said first input being connected to receive a first command signal and said second, inverting input being connected to said sign bit of said first input signal;

a second AND gate having a first and second inputs and generating a second output signal, said first input being connected to receive a second command signal and said second input being connected to said sign bit of the output signal of said arithmetic logic unit;

an OR gate receiving the first and second output signals, respectively, of said first and second AND gates and generating a first selecting output signal;

an inverter connected to the output of said AND gate and generating a second selecting output signal; and a selector circuit responsive to having an output directly connected to said first output terminal and responsive to said first and second selecting output signals, respectively, of said AND gate and said inverter for selecting one of the outputs of said arithmetic logic circuit and said arithmetic circuit; and an output circuit having first and second output terminals, an output signal of said selector being directly obtained at said first output terminal, and an output signal of said arithmetic circuit being directly obtained at said second output terminal, said output signal of said selector at said first output terminal and said output signal of said arithmetic circuit at said second output terminal being obtained in parallel;

wherein a calculation of addition and subtraction with selection is instructed when said first command signal is "1" and said second command signal is "0", said arithmetic logic circuit carries out said first subtraction, said arithmetic circuit carries out said addition of said first and second input signals, and said selector means selects an output signal of said arithmetic circuit in a first case that said first input signal is positive, and an output signal of said arithmetic logic circuit in a second case that said first input signal is negative, so that a result of said addition is obtained at said first output terminal in said first case, and a result of said first subtraction is obtained at said first output terminal in said second case.

7. An arithmetic logic unit, according to claim 6, wherein a calculation of parallel addition and subtraction is instructed when said first and second command signals are both "0", said arithmetic logic circuit carries out said first subtraction, said arithmetic circuit carries out said addition of said first and second input signals, and said selector means selects an output signal of said arithmetic logic circuit, so that a result of said first subtraction is obtained at said first output terminal, and a result of said addition is obtained at said second output terminal.

8. An arithmetic logic unit, according to claim 6, wherein a calculation of an absolute value of a difference is instructed when said first command signal is "0" and said second command signal is "1", said arithmetic circuit carries out said subtraction, and said selector means selects an output signal of said arithmetic logic circuit in case that said output signal of said arithmetic logic circuit is positive, and an output signal of said arithmetic circuit in case that said output signal of said arithmetic logic circuit is negative, so that an absolute value of a difference between said first output terminal.

* * * * *